(12) United States Patent
Kim et al.

(10) Patent No.: US 8,598,830 B2
(45) Date of Patent: Dec. 3, 2013

(54) IMAGE FORMING APPARATUS, MOTOR CONTROL APPARATUS AND MOTOR CONTROL METHOD THEREOF

(75) Inventors: Hyoung-il Kim, Hwaseong-si (KR); Yong-ho You, Suwon-si (KR); Seong-ho Shin, Yongin-si (KR); Young-Jung Yun, Suwon-si (KR); Yae-young Kim, Hwaseong-si (KR); Gwon-hoon Kim, Seoul (KR); Ho-bin Hwang, Hwaseong-si (KR); Ji-young Byun, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 113 days.

(21) Appl. No.: 13/064,326

(22) Filed: Mar. 18, 2011

(65) Prior Publication Data

US 2012/0007529 A1   Jan. 12, 2012

(30) Foreign Application Priority Data

Jul. 8, 2010   (KR) ......................... 10-2010-0065844

(51) Int. Cl.
*G05B 11/28* (2006.01)
(52) U.S. Cl.
USPC .......................................... 318/599; 318/152
(58) Field of Classification Search
USPC .................................................. 318/599, 152
See application file for complete search history.

(56) References Cited

U.S. PATENT DOCUMENTS

| | | | |
|---|---|---|---|
| 6,990,048 B2 * | 1/2006 | Ono et al. .................. 369/44.28 |
| 7,038,404 B2 * | 5/2006 | Kameyama ..................... 318/34 |
| 7,417,661 B2 * | 8/2008 | Sugimoto ..................... 347/261 |
| 8,169,172 B2 * | 5/2012 | Markunas et al. ....... 318/400.24 |
| 2008/0175729 A1 * | 7/2008 | Kato et al. ..................... 417/353 |
| 2009/0051693 A1 * | 2/2009 | Rokushima et al. .......... 345/520 |
| 2010/0001670 A1 * | 1/2010 | Scalese .................... 318/400.09 |

FOREIGN PATENT DOCUMENTS

| | | |
|---|---|---|
| JP | 2001-119971 | 4/2001 |
| JP | 2006-187098 | 7/2006 |

* cited by examiner

*Primary Examiner* — Eduardo Colon Santana
*Assistant Examiner* — Iftekhar Mustafa
(74) *Attorney, Agent, or Firm* — Staas & Halsey LLP

(57) ABSTRACT

An image forming apparatus includes an engine unit used for performing an image forming job, an engine control unit which controls the operation of the engine unit, a brushless direct current (BLDC) motor which drives the engine unit, a sensor unit which senses the driving information of the BLDC motor, a communication interface unit which receives a digital control command with respect to the BLDC motor from the engine control unit, a driving signal unit which generates a driving signal to control the BLDC motor, and a digital control unit which controls the operation of the driving signal unit in a digital PLL manner, based on the received digital control command, the detected driving information and a digital gain value as a control factor with respect to the BLDC motor.

19 Claims, 18 Drawing Sheets

FIG. 6

| DIGITS | | | | | | | | SHIFT OPERATION COMBINATION | | | | | | | |
|---|---|---|---|---|---|---|---|---|---|---|---|---|---|---|---|
| [15] | [14] | [13] | [12] | [11] | [10] | [9] | [8] | [7] | [6] | [5] | [4] | [3] | [2] | [1] | [0] |
| 0 | 0 | 0 | 0 | 0 | 0 | 0 | 0 | $2^{-7}$ | $2^{-6}$ | $2^{-5}$ | $2^{-4}$ | $2^{-3}$ | $2^{-2}$ | $2^{-1}$ | $2^{-0}$ |
| 0 | 0 | 0 | 0 | 0 | 0 | 0 | 1 | $2^{-8}$ | $2^{-7}$ | $2^{-6}$ | $2^{-5}$ | $2^{-4}$ | $2^{-3}$ | $2^{-2}$ | $2^{-1}$ |
| 0 | 0 | 0 | 0 | 0 | 0 | 1 | 0 | $2^{-9}$ | $2^{-8}$ | $2^{-7}$ | $2^{-6}$ | $2^{-5}$ | $2^{-4}$ | $2^{-3}$ | $2^{-2}$ |
| 0 | 0 | 0 | 0 | 0 | 0 | 1 | 1 | $2^{-10}$ | $2^{-9}$ | $2^{-8}$ | $2^{-7}$ | $2^{-6}$ | $2^{-5}$ | $2^{-4}$ | $2^{-3}$ |
| 0 | 0 | 0 | 0 | 0 | 1 | 0 | 0 | $2^{-11}$ | $2^{-10}$ | $2^{-9}$ | $2^{-8}$ | $2^{-7}$ | $2^{-6}$ | $2^{-5}$ | $2^{-4}$ |
| .... | | | | | | | | .... | | | | | | | |

FIG. 8

| Address | Mode | Data1 |
|---------|------|-------|
| 0x00 | R/W | 0xAA |
| 0x01 | R/W | 0xBB |
| 0x02 | R/W | 0xCC |
| 0x03 | R | 0xDD |

FIG. 11

| Motion Control GPIO | Start/Stop |
| | Direction |
| | Brake |
| | CLOCK |
| | Ready(LD) |

FIG. 12

Three-Phase Logic Truth Table
(A high Input(H) is the state where Hxp > HxN)

| Item | Forward | | | Reverse | | | Output | |
|---|---|---|---|---|---|---|---|---|
| | HA | HB | HC | HA | HB | HC | - | PWM |
| 1 | H | L | H | L | H | L | VH | UL |
| 2 | H | L | L | L | H | H | WH | UL |
| 3 | H | H | L | L | L | H | WH | VL |
| 4 | L | H | L | H | L | H | UH | VL |
| 5 | L | H | H | H | L | L | UH | WL |
| 6 | L | L | H | H | H | L | VH | WL |

IMAGE FORMING APPARATUS, MOTOR CONTROL APPARATUS AND MOTOR CONTROL METHOD THEREOF

CROSS-REFERENCE TO RELATED APPLICATIONS

This application claims priority from Korean Patent Application No. 10-2010-0065844, filed on Jul. 8, 2010, in the Korean Intellectual Property Office, the disclosure of which is incorporated herein by reference in its entirety.

BACKGROUND

1. Field

Apparatuses and methods consistent with the disclosure provided herein relate to an image forming apparatus, a motor control apparatus, and a method for controlling a motor thereof, and more particularly, to an image forming apparatus, a motor control apparatus and a motor control method thereof, capable of varying a gain value with respect to a BLDG motor easily.

2. Description of the Related Art

An image forming apparatus generally operates to generate, print out, receive or transmit image data. The examples of the image forming apparatus include, mainly, printers, scanners, copiers, facsimiles, and multi function unit (MFU) integrating the functions mentioned above.

The image forming apparatuses generally employ motors to carry out various functions including advancing of the printing mediums, feeding of the printing mediums, or the like. The recent image forming apparatuses generally employ an increased number of motors to support various optional units such as auto document feeder (ADF) unit, finisher unit, high capacity feeder (HCF) unit, double capacity feeder (DCF) unit, or the like.

The recent image forming apparatuses increasingly utilize a brushless direct current (BLDC) motor to prevent noise from driving operation. The BLDC motor omits the brush structure from the DC motor and electrically carries out rectification. Since the BLDC motor omits the possible mechanical friction between brush and rectifier, speedy and silent operation is possible.

Meanwhile, the BLDG motor, being brushless, generally employs a driving circuit to detect the location of the rotor using sensors such as Hall sensor, and control by sequentially applying electric power to the respective phases of the BLDG motor.

Specifically, the convention manner of controlling the BLDC motor utilizes an analog type phase locked loop (PLL) driving circuit. However, since the analog PLL adjusts the control gain value using a manual element such as a connected external resistor or capacitor, it is difficult to change the control gain value without changing the components, once the control gain value is fixed.

SUMMARY

Exemplary embodiments overcome the above disadvantages and other disadvantages not described above. Also, the embodiments are not required to overcome the disadvantages described above, and an exemplary embodiment may not overcome any of the problems described above.

According to one embodiment, an image forming apparatus, a motor control apparatus and a motor control method thereof are provided, which are capable of changing a control gain value with respect to a BLDG motor easily.

In one embodiment, an image forming apparatus may include an engine unit used for performing an image forming job, an engine control unit which controls the operation of the engine unit, a brushless direct current (BLDC) motor which drives the engine unit, a sensor unit which senses the driving information of the BLDG motor, a communication interface unit which receives a digital control command with respect to the BLDG motor from the engine control unit, a driving signal unit which generates a driving signal to control the BLDG motor, and a digital control unit which controls the operation of the driving signal unit in a digital PLL manner, based on the received digital control command, the detected driving information and a digital gain value as a control factor with respect to the BLDG motor.

In one embodiment, a motor control apparatus may include a brushless direct current (BLDG) motor, a communication interface unit which receives a digital control command with respect to the BLDG motor, a sensor unit which detects the driving information of the BLDG motor, a driving signal unit which generates a driving signal to control the BLDG motor, and a digital control unit which controls the operation of the driving signal unit in a digital PLL manner, based on the received digital control command, the detected driving information and a digital gain value as a control factor with respect to the BLDG motor.

The digital control unit may include an error detecting unit which computes a digital error value by comparing the received digital control command with the detected driving information, a computing unit which computes a PWM duty ratio of the BLDC motor using the computed digital error value and the digital gain value, and a PWM generating unit which generates the PWM signal with respect to the BLDG motor based on the computed PWM duty ratio.

The error detecting unit may include a frequency error detecting unit which computes a frequency error value by comparing a velocity command value with respect to the BLDG motor with velocity information of the BLDG motor, and a phase error detecting unit which computes a phase error value by comparing a velocity command value with respect to the BLDG motor with velocity information of the BLDG motor.

The computing unit computes the PWM duty ratio by computing shift operation with respect to the computed frequency error value and the computed phase error value, and a digital gain value corresponding to the frequency error value and the phase error value.

The sensor unit may include an electric angle detecting unit which receives electric angle information from a Hall sensor attached to the BLDG motor, and a velocity detecting unit which receives the velocity information of the BLDG motor as a frequency form.

The digital control unit controls the operation of the driving signal unit using the velocity information of the velocity detecting unit in a digital manner.

The sensor unit may additionally include a tacho generating unit which generates velocity information regarding the BLDG motor using the received electric angle information, and wherein the digital control unit controls the operation of the driving signal unit in a digital manner using the velocity information of the tacho generating unit.

The motor control apparatus may additionally include an analog control unit which analogously controls the operation of the driving signal unit based on the received digital control command and the detected driving information, and a switching unit which switches a connectional status between the driving signal unit with the digital control unit or the analog control unit.

The communication interface receives the digital control command in one of serial peripheral interface (SPI) and I₂C.

The digital control command may include at least one information from among: rotation start/stop, acceleration/deceleration, direction of rotation, velocity command value, brake operation, lock time, and a digital gain value, with respect to the BLDC motor.

The motor control apparatus may additionally include a register which stores the received digital control command.

The motor control apparatus may additionally include a lock protection unit which stops the operation of the driving signal unit based on lock time from among the received digital control commands.

The motor control apparatus may additionally include a direct current (DC) motor, and wherein the digital control unit controls the DC motor, while also controlling the BLDC motor.

There may be a plurality of BLDG motors, in which case there are a plurality of sensor units, digital control units and driving signal units to correspond to the plurality of BLDG motors, respectively, and the communication interface unit transfers the received digital control command to a corresponding digital control unit from among the plurality of digital control units.

The BLDC motor is at least one of OPC motor, fuser motor and polygon motor.

The communication interface unit and the digital control unit are implemented as one single chip.

According to one embodiment, a motor control method of a brushless direct control (BLDC) motor, may include receiving a digital control command with respect to the BLDC motor, detecting the driving information of the BLDC motor, computing a digital error value by comparing the received digital control command with the detected driving information, computing a PWM duty ratio of the BLDG motor using the computed digital error value and the digital gain value, and generating the PWM signal with respect to the BLDG motor based on the computed PWM duty ratio, and generating a driving signal to control the BLDC motor based on the generated PWM signal.

The driving information may include at least one of electric angle information of the BLDC motor and rotation velocity information of the BLDC motor.

The generating the driving signal may include generating a driving signal with respect to at least one of a stepper motor and a DC motor, while also generating the driving signal regarding the BLDC motor.

BRIEF DESCRIPTION OF THE DRAWINGS

The above and/or other aspects will be more apparent by describing certain exemplary embodiments with reference to the accompanying drawings, in which:

FIG. 6 is a table associated with a method for setting a digital gain value according to an embodiment;

FIG. 8 is a view provided to explain in detail the structure and operation of the tacho generator of FIG. 3;

FIGS. 9 to 12 are views provided to explain the operation of the communication interface unit of FIG. 2;

DETAILED DESCRIPTION

Figure 1:
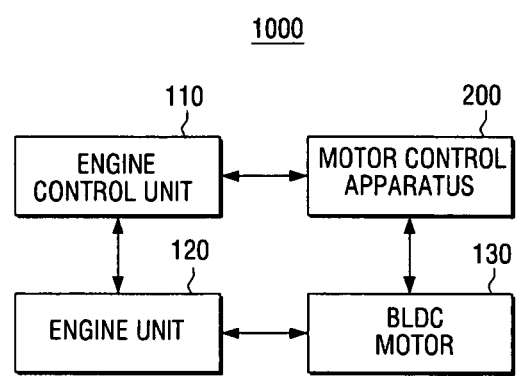
FIG. 1 illustrates an image forming apparatus according to an embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments can be carried out without those specifically defined matters. Also, well-known functions or constructions are not described in detail since they would obscure the invention with unnecessary detail.

FIG. 1 illustrates an image forming apparatus according to an embodiment.

Referring to FIG. 1, the image forming apparatus 1000 may include an engine control unit 110, an engine unit 120, a BLDC motor 130, and a motor control apparatus 200.

The engine control unit 110 controls the operation of the engine unit 120 which is used for executing an image forming job, and sends out a digital control command with respect to the BLDC motor to drive the engine unit 120 to the motor control apparatus 200. Specifically, upon receiving a print job, the engine control unit 110 controls the engine unit 120 to execute the print job. Additionally, the engine control unit 110 may transfer a digital control command to the motor control apparatus 200 to drive the BLDC motor 130 to thus drive the engine unit 120.

For example, the engine control unit 110 may transfer to the motor control apparatus 200 the digital control command regarding the operation of the BLDC motor including, rotation start/stop, acceleration/deceleration, direction of rotation, speed command value, break operation, lock time, digital gain value, or the like.

The engine control unit 120 may receive from the motor control apparatus 200 the information about the operational status of the BLDC motor 130.

The engine unit 120 performs the image forming job. Specifically, the engine unit 120 may execute the image forming job according to the control of the engine control nit 110 and the driving of the BLDC motor 130.

The BLDC motor 130 is provided inside the image forming apparatus, and receives sequentially-inputted three phase electric power and drives at constant speed or accelerates according to the inputted three phase electric power. The BLDC motor 130 may also drive in a forward or backward direction according to the order of phases of the inputted three phase electric current. The BLDG motor 130 may include an opto photo-organic conductor BLDG motor, fuser BLDG motor or polygon BLDC motor.

Meanwhile, the BLDC motor 130 may include a Hall sensor to detect electric angle inside the motor and a velocity sensor to detect the velocity of rotation. Specifically, the Hall sensor may be attached to the BLDC motor to detect the change in electric angle inside the DC motor, and the velocity sensor outputs the information regarding the driving velocity of the BLDC motor as a frequency form. The electric angle information and the driving velocity information detected through the Hall sensor and the velocity sensor may be transferred to the motor control apparatus 200 which feedback controls the BLDC motor 130 based on the transferred electric angle information and the driving velocity information. Although the embodiment uses the Hall sensor and the velocity sensor, other types of sensors may also be utilized to detect the driving operation of the motor.

The motor control apparatus 200 receives a digital control command with respect to the BLDC motor from the engine control unit 110 and generates a driving signal with respect to the BLDC motor 130 according to the received digital control command. The structure and operation of the motor control apparatus 200 will be explained in detail below with reference to FIGS. 2 and 3.

Figure 2:
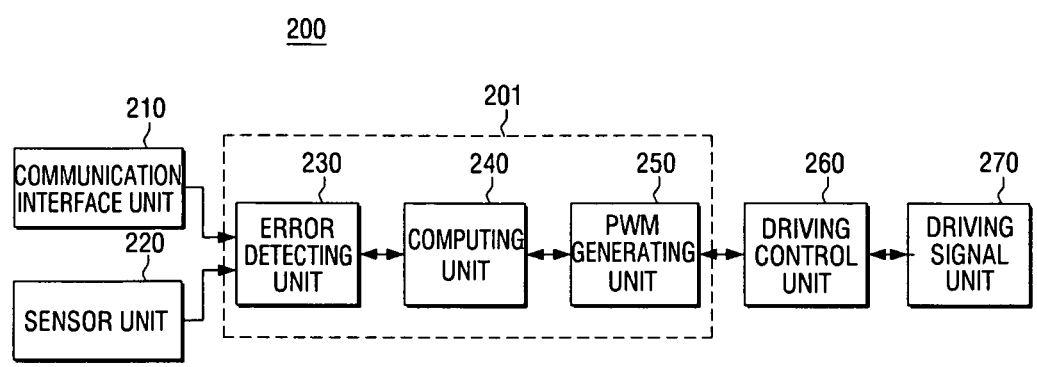
FIGS. 2 and 3 illustrate the structure of the motor control apparatus of FIG. 1 in detail.
Figure 3:
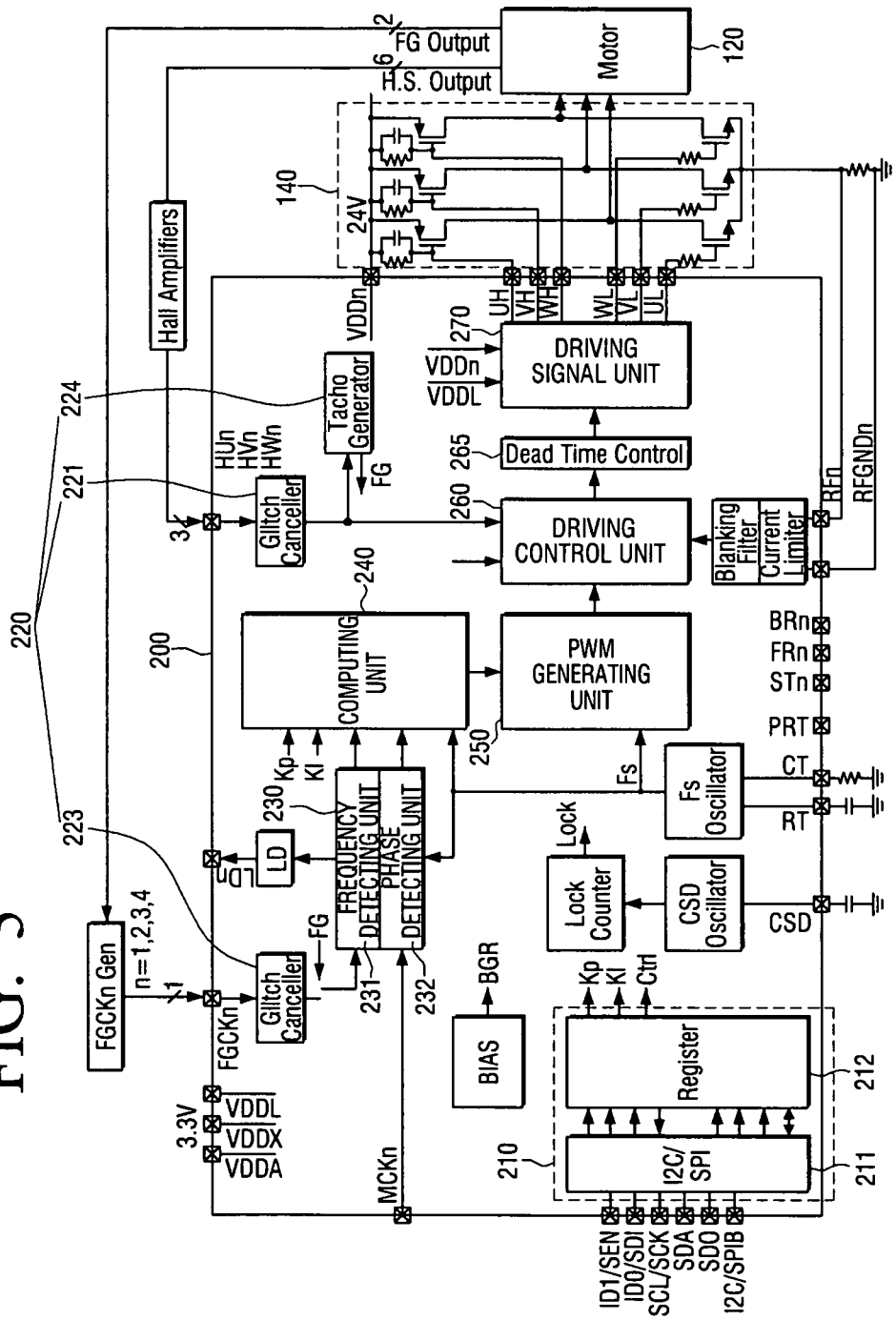

FIGS. 2 and 3 illustrate the structure of the motor control apparatus of FIG. 1.

Referring to FIGS. 2 and 3, the motor control apparatus 200 according to an embodiment may include a communication interface unit 210, a sensor unit 220, a digital control unit 201, a driving control unit 260, a lock protection unit 265, and a driving signal unit 270.

The communication interface unit 210 receives a digital control command with respect to the BLDC motor. Specifically, the communication interface unit 210 may include a serial interface 211 and a register 212.

The serial interface 211 may receive a digital control command to be used for controlling the operation of the BLDC motor from the engine control unit 110. The digital control command may include information regarding the BLDC motor, including the rotation start/stop, acceleration/deceleration, direction of rotation, velocity command value, brake operation, lock time, or digital gain value.

The digital control command may be received from the engine control unit 110 via serial peripheral interface (SPI) which enables data exchange between two devices by serial communication, and the serial communication interface such as a bidirectional serial bus (I$_2$C).

The serial interface 211 may read out a control signal from the received digital control command. Specifically, the serial interface 211 may read out, from the digital control command received through ID1/SEN, ID0/SDI, SCUSCK, SDA, SDO, I$_2$C /SPIB terminals, various control signals (or driving command such as rotation start/stop, acceleration/deceleration, direction of rotation, velocity of rotation, or brake operation) with respect to the BLDC motor.

Meanwhile, the serial interface 211 may transfer status information of the BLDC motor to the print engine unit 110. Specifically, the serial interface 211 may transfer information including preparation, temperature or presence of overcurrent per channel, to the print engine unit. For example, if overcurrent is detected in the BLDC motor during the motor controlling, such information may be transferred to the print engine unit 110 to request a protection of the motor.

Furthermore, the serial interface 211 may receive not only the digital control information related to the controlling of the BLDC motor, but also information related to the manner of controlling inside the motor control apparatus 200. Specifically, the serial interface 211 may receive information related to the manner of controlling, including, for example, chip enable (i.e, whether or not power saving mode is executed), PWM frequency (phase voltage applied frequency of BLDC motor), lock time (waiting time until motor turns to normal status, or a predetermined time upon elapse of which voltage is cutoff to protect the motor), tacho generator control (whether or not tacho generator is operated), or digital gain value, and use the received information related to the control manner when controlling the BLDC motor.

The register 212 may store the received digital control command from the serial interface 211. Specifically, the register 212 may store information regarding corresponding control signal and manner necessary for controlling a specific BLDC motor in the received digital control command.

The sensor unit 220 may detect the driving information of the BLDG motor. Specifically, the sensor unit 220 may include an electric angle detecting unit 221, a velocity detecting unit 223, and a tacho generating unit 224.

The electric angle detecting unit 221 may receive electric angle information from the Hall sensor attached to the BLDG motor and transfer the related information to the digital control unit 201.

The velocity detecting unit 223 may receive the information regarding the rotational velocity of the BLDG motor from the velocity sensor attached to the BLDG motor in a frequency form, and transfer the received frequency form of the velocity information (e.g., FG signal) to the digital control unit 201.

The tacho generating unit 224 may generate velocity information regarding the BLDG motor using the received electric angle information. Specifically, the tacho generating unit 224 may convert the three phase electric angle information received from the electric angle detecting unit 221 into a velocity information signal. The structure and operation of the tacho generating unit 224 will be explained in greater detail below with reference to FIG. 7.

The digital control unit 201 carries out digital PLL control on the BLDG motor, based on the digital control command as detected, driving information as detected, and digital gain value with respect to the BLDG motor. Specifically, the digital control unit 201 may include an error detecting unit 230, a computing unit 240, and a PWM generating unit 250.

The error detecting unit 230 may compute a digital error value by comparing the received digital control command with the detected driving information. Specifically, the error detecting unit 280 may include a frequency error detecting unit 231 and a phase error detecting unit 232.

The frequency error detecting unit 231 may compute a frequency error value by comparing the velocity command value with respect to the BLDG motor with the velocity information of the BLDC motor. Specifically, the frequency error detecting unit 231 may compute the frequency error value by comparing the velocity command value extracted at the communication interface unit 210 with the velocity information of the BLDC motor detected at the sensor unit 220. The operation of the frequency error detecting unit 231 will be explained in detail below with reference to FIG. 4.

The phase error detecting unit 232 computes a phase error value by comparing a velocity command value with respect to the BLDC motor with the velocity information of the BLDC motor. Specifically, the phase error detecting unit 232 may compute the phase error value by comparing the velocity command value extracted at the communication interface unit 210 with the velocity information of the BLDC motor which is detected at the sensor unit 220. The operation of the phase error detecting unit 232 will be explained in detail below with reference to FIG. 5.

The computing unit 240 may compute the PWM duty ratio of the BLDC motor using the computed digital error value and the digital gain value. Specifically, the computing unit 240 may compute the PWM duty ratio (or command voltage) with respect to the BLDC motor, using the frequency error value computed at the error detecting unit 231 and the digital gain value received at the communication interface unit 210. For example, the computing unit 240 may compute the command voltage (or PWM duty ratio) with respect to the BLDC motor using:

$$\text{volt}=((\text{FrequencyError}*\text{FKP}+\Sigma\text{FrequencyError}*\text{FKI})+(\text{PhaseError}*\text{PKP}+\Sigma\text{PhaseError}*\text{PKI}) \quad [\text{mathematical expression 1}]$$

where volt denotes a command voltage with respect to the BLDC motor, FrequencyError is a frequency error value computed at the frequency error detecting unit 231, PhaseError is a phase error value computed at the phase error detecting unit 232, FKP (Frequency P Gain) is a P gain value with respect to frequency, FKI (Frequency I Gain) is an I gain value with respect to frequency, PKP(Phase P Gain) is a P gain value with respect to phase, and PKI (Phase I Gain) is a I gain value with respect to phase.

Referring to mathematical expression 1 above, the BLDC motor is controlled using only the PI control of the PID controlling. That is, D control is omitted in one embodiment. However, depending on the manner of implementation, the BLDC motor may be controlled using the PID controlling including PI and D controls.

Furthermore, although the frequency control (using frequency error value) and the phase control (using the phase error value) are performed concurrently according to one embodiment, only the frequency control or only the phase control may be performed in another exemplary embodiment.

For example, if acceleration control for the BLDC motor is performed, only the frequency control may be performed, and if the BLDC motor reaches constant velocity, only the phase control may be performed. In other words, it is possible to apply different controlling manner according to the operational status of the BLDC motor.

Meanwhile, the computing unit 240 may compute the PWM duty ratio using shift operation. Specifically, the operation in the form of Frequency Error*FKP in mathematical expression 1 above may be changed to:

$$\text{FrequencyError}*\text{FKP}=(\text{FrequencyError}>>X)+(\text{FrequencyError}>>X)+(\text{FrequencyError}>>X) \quad [\text{mathematical expression 2}]$$

For example, if FKP=0.350, by approximating FKP to 0.3496, the following expression is obtained.

$$\text{FrequencyError}*0.3496=(\text{FrequencyError}>>2)+(\text{FrequencyError}>>4)+(\text{FrequencyError}>>5)+(\text{FrequencyError}>>8)+(\text{FrequencyError}>>9) \quad [\text{mathematical expression 3}]$$

Since the computing unit 240 carries out decimal computation using the shift operation, it is possible to compute the PWM duty ratio in a system which has low resources.

The PWM generating unit 250 generates a PWM signal with respect to the BLDC motor based on the computed PWM duty ratio. Specifically, the PWM generating unit 250 may generate the PWM signal according to the PWM duty ratio computed at the computing unit 240.

The driving control unit 260 controls the driving signal unit 270 based on the generated PWM signal and the detected driving information. Specifically, the driving control unit 260 may control the driving signal generated at the driving signal unit 270, which will be explained below, based on the PWM signal generated at the PWM generating unit 250 and the electric angle information received from the electric angle sensor unit 221.

The lock protection unit 265 stops the operation of the driving signal unit based on the lock time from among the received digital control commands. Specifically, if electric current is applied constantly to the motor in a state that the motor can not operate anymore due to increased load, the motor has increased heat which may damage other components such as motor coil, or cause fire. Accordingly, the lock protection unit 265 may cut off the supply of electric current to the motor, if the rotational status of the motor is not in normal status after a predetermined time elapses. The 'predetermined time' herein is the lock time.

The lock time maybe set to different values depending on the types of the driving motors (e.g., 2 seconds for OPC motor, 8 seconds for polygon motor), driving modules, or external environment (e.g., 2 seconds at atmospheric temperature, 4 seconds at low temperature). Additionally, the lock time may be varied easily through the communication interface unit 210 according to the control of the engine control unit 110.

As explained above, due to the presence of the lock protection unit 265, the motor control apparatus 200 may provide increased reliability and protection in the operation of the motor controlling. Furthermore, since it is possible to vary the lock time to suit the operational environment of the system without having to change the circuit, more adaptive controlling of the BLDC motor is possible.

The driving signal unit 270 generates a driving signal to control the BLDC motor 130. Specifically, the driving signal unit 270 may generate a three phase driving signal to control the BLDC motor 130 based on the switching sequence as the one illustrated in FIG. 12.

As explained above, since the motor control apparatus 200 controls the BLDG motor using the digital PLL controlling, the control gain value with respect to the BLDC motor can be varied easily. Furthermore, since the motor control apparatus 200 can be implemented as one single ASIC chip, the interior circuit of the image forming apparatus 100 can be simpler.

Although one motor control apparatus 200 uses the switching element 140 to control the BLDC motor according to the controlling manner in the example explained above with reference to FIGS. 2 and 3, other examples are also possible. For example, referring to FIG. 14, one motor control apparatus ay control two or more BLDG motors, or one motor control apparatus 200 may control the BLDG motor and also the DC motor together.

Figure 4:
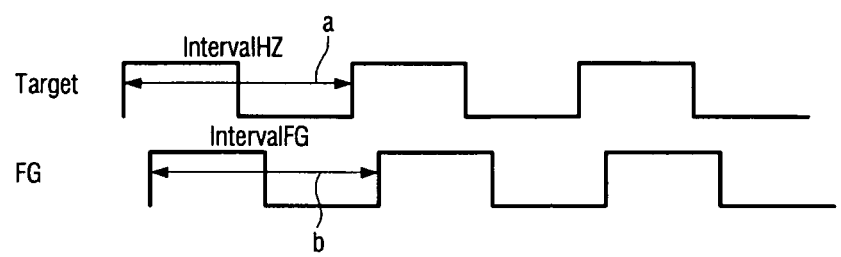
FIG. 4 is a view provided to explain the operation of a frequency error detecting unit of FIG. 3.

FIG. 4 illustrates the operation of the frequency error detecting unit 231 of FIG. 3.

Referring to FIG. 4, the frequency error detecting unit 231 compares the velocity command value with respect to the BLDC motor with the velocity information (i.e., FG frequency) of the BLDC motor. Specifically, the frequency error detecting unit 231 counts the number of MCLK pulses (IntervalHZ) from the rising edge of the clock inputted as the velocity command value to the next rising edge. The frequency error detecting unit 231 also counts IntervalFG using the master clock (Mclk) with respect to the detected FG frequency of the BLDG motor.

The frequency error detecting unit 231 then computes a frequency error based on the difference between the counted IntervalHz and IntervalFG. The Mclk may have several tens of MHz. Meanwhile, the velocity of the motor is actually even lower if IntervalFG (number of pulses of FG frequency) is large. Accordingly, the frequency error detecting unit 231 may compute a frequency error value with positive sign to increase the command voltage of the BLDG motor. On the contrary, the frequency error detecting unit 231 may compute a frequency error value with negative sign. The positive and negative signs may be applied in opposite manner depending on the manner of implementation.

Figure 5:
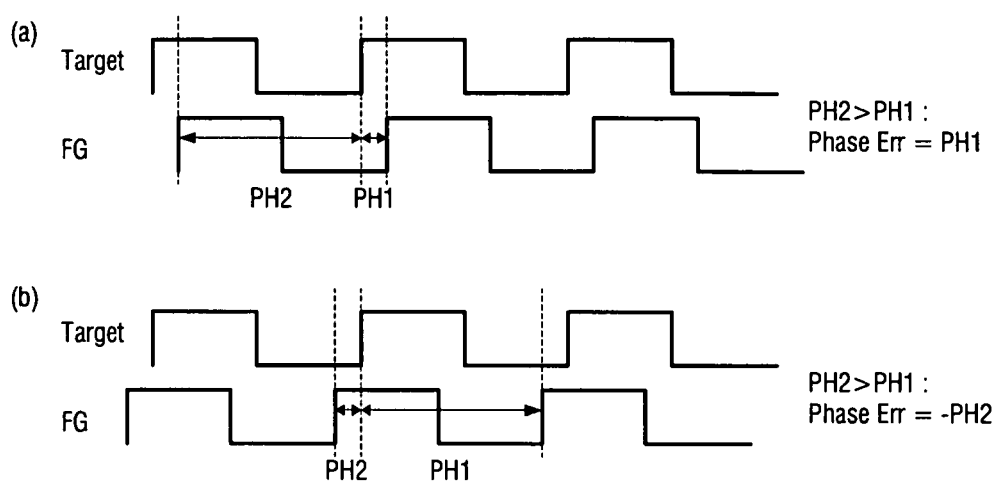
FIG. 5 is a view provided to explain the operation of the phase error detecting unit of FIG. 3.

FIG. 5 illustrates the operation of the phase error detecting unit 232 of FIG. 3.

Specifically, by defining FH2 as the duration from the rising edge of the FG frequency to the rising edge of the velocity command value, and defining PH1 as the duration from the rising edge of the velocity command value to the rising edge of the FG frequency, if PH2>PH1, it may be determined that FG is delayed as much as PH1. Accordingly, the phase error detecting unit 232 may compute a phase error value having a size of PH1 with positive sign to increase the voltage command value, if PH2>PH1.

On the contrary, i.e., if PH2<PH1, the phase error detecting unit 232 may determine that FG is ahead as much as PH2 and thus compute the phase error based on PH2 with negative sign to decrease the voltage command value.

FIG. 6 is a table related to a method of setting a digital gain value according to an embodiment.

Specifically, since the range of setting a gain is in close relation with the following performance of the motor control apparatus 200 to the variation of the system, the settable gain range of the controller has to be increased. In the method of setting the digital gain value according to one embodiment, the upper four bits are used as the digits of the shift operation. By using the upper bits as the digits, the gain range is improved. Specifically, compared to the conventional method where the movable gain range by the 16 bit register size is 0-15th power, the gain range is expanded to 0-26th power when the upper bits are used as the digits.

Figure 7:
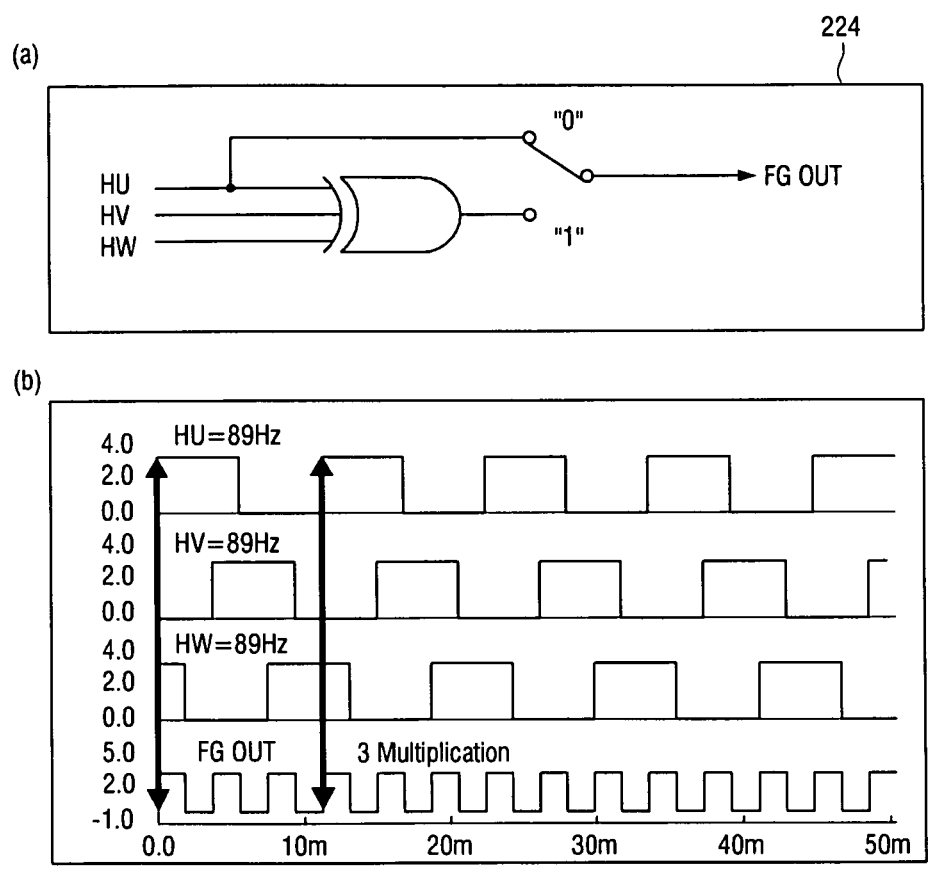
FIG. 7 illustrates a motor control apparatus according to another embodiment.

FIG. 7 is a view provided to explain in detail the structure and operation of the tacho generator of FIG. 3

Referring to FIG. 7A, the tacho generator 224 receives a three phase Hall sensor signal and generates the received three phase Hall sensor signal into one single signal using exclusive OR gate. Specifically, in the case of a BLDC motor, there are three Hall sensors arranged at 120° intervals to detect the location of the rotator. The Hall sensor detects N and S poles of a permanent magnet and generates a signal, and if attached to the BLDC motor in which the rotator has ten poles, the Hall sensor generates 5-pulse Hall signal per rotation. Since three Hall sensors are attached to the BLDC motor in this embodiment, the tacho generator 224 generates 5*3=15 pulses per rotation.

Meanwhile, the tacho generator 224 may generate information about the direction of rotation by the BLDC motor. Specifically, the tacho generator 224 may generate the direction information using the electric angle information (or Hall signal) received from the electric angle detector 221. For example, if the status of the Hall sensors (HU, HV, HW) changes from 1 0 1 to 1 0 0, the tacho generator 224 may determine, based on the change of the Hall sensors, that the rotation of the BLDC motor is in CW direction. On the contrary, if the status of the Hall sensors (HU, HV, HW) changes from 1 0 1 to 0 0 0, the tacho generator 224 may determine that the rotation of the BLDC motor is in CCW direction.

The velocity information generated at the tacho generator 224 may be used instead of the velocity information of the velocity detecting unit 222. That is, it is possible to control the velocity of the BLDC motor without using the FG signal.

FIGS. 8 to 11 are views provided to explain the operation of the communication interface unit of FIG. 2.

The communication interface unit 210 according to an embodiment supports both $I_2C$ and SPI as the serial interface methods. Specifically, the communication interface unit 210 may use the same port for the clock input of SPI and the clock input of $I_2C$ to support for both interfaces using minimum resources.

Figure 9A:
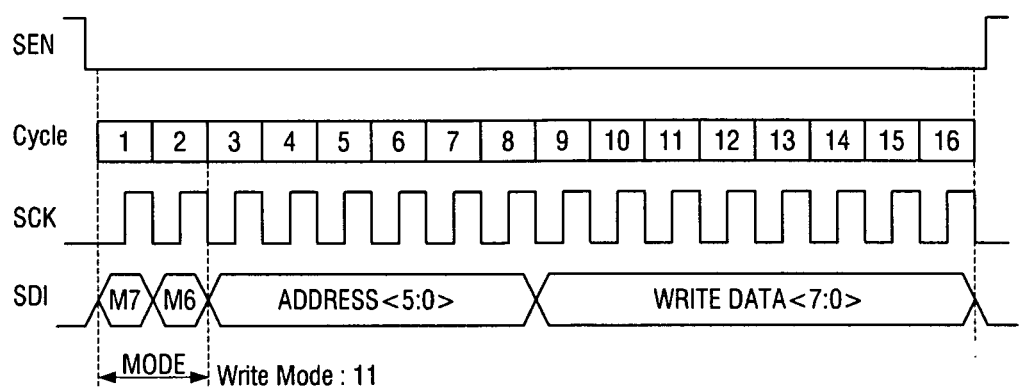
Figure 9B:
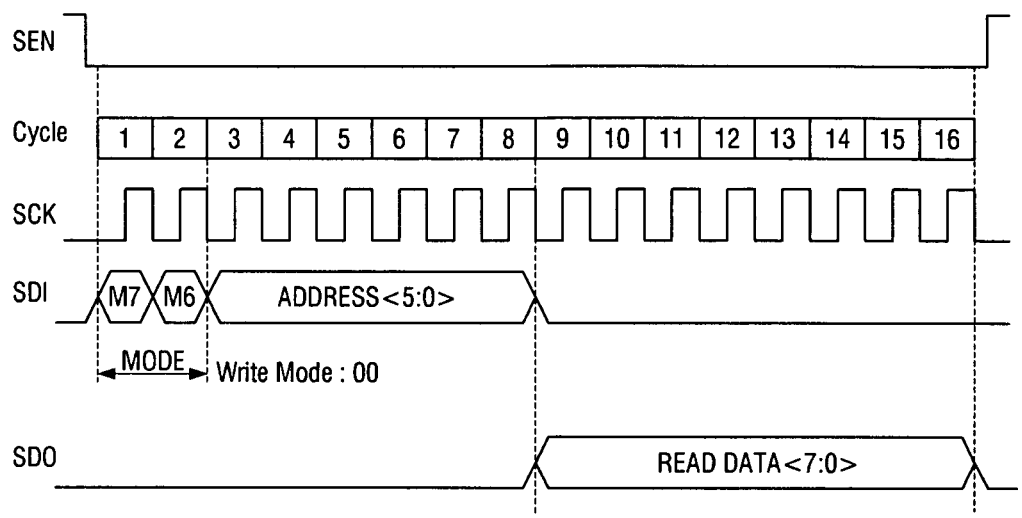
Figure 10A:
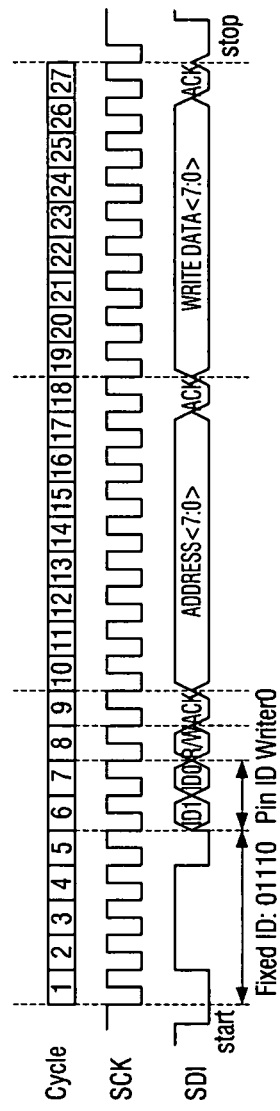
Figure 10B:
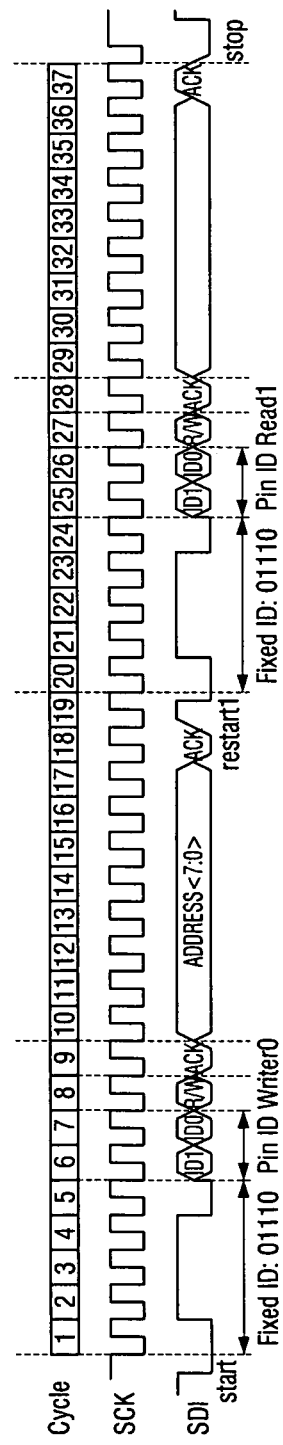

The SPI protocol illustrated in FIG. 9, and the $I_2C$ protocol illustrated in FIG. 10 may be used to use the same register block. Specifically, in order to unify SPI and $I_2C$ register, the $I_2C$ command address byte may be constructed to a value that is same as SPI mode+address <5:0>.

However, the protocols illustrated in FIGS. 8 to 10 are only illustrative examples, and depending on the manner of implementation, the number of bytes of the address and data may be varied. Additionally, it is also possible to expand the $I_2C$ Slave ID.

Meanwhile, the information stored in the register 212 may include information related to the operation of the BLDC motor, including rotation start, rotation stop, brake, direction of rotation, chip enable (i.e., chip enable/disable for power saving purpose), PWM frequency (phase voltage applied frequency of BLDC motor), lock time (waiting time until motor reaches normal status, preset time upon elapse of which the voltage is cutoff for the protection of the motor), tacho generator control (control on the function of tacho generator), digital gain and chip status monitoring (overcurrent protection; OCP), thermal shut down (TSD), or motor lock).

Meanwhile, if serial interface is implemented, there may be a delay of response. Accordingly, particularly for the operations such as driving, stop, brake, or change of direction, which requires relatively fast response, a separate GPIO port as illustrated in FIG. 11 may be used. By using the separate GPIO port, the possibility of having delay between the engine control unit 110 and the motor control apparatus 200 decreases.

Figure 13:
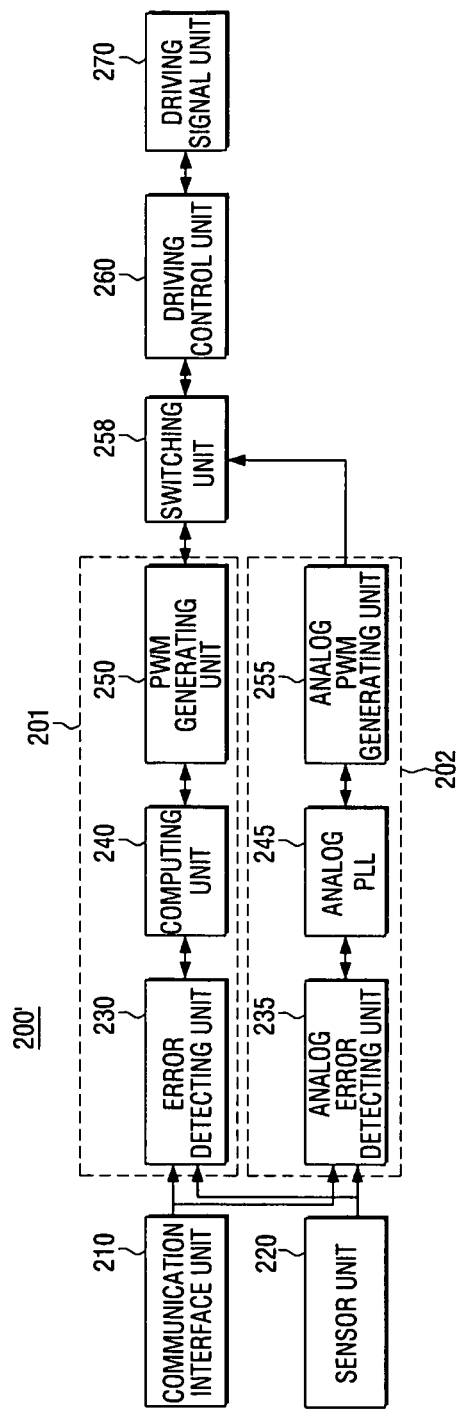
FIG. 13 is a view provided to explain the operation of the driving signal unit of FIG. 2.

FIG. 13 illustrates the motor control apparatus 200' according to another embodiment.

The BLDC motor according to an embodiment may be a polygon BLDC motor. The polygon BLDC motor is generally used as a driving source of a LSU system, and requires a considerably higher performance of constant speed control than general driving systems (that is, general OPC driving requires 0.5% or lower speed ripple performance, but polygon BLDG motor requires 0.01% or lower), and has a considerably higher driving speed band by approximately 20000 RPM to 40000 RPM compared to 1000 to 4000 RPM of the general motors. Furthermore, the polygon BLDG motor drives under condition where there is almost no load and the characteristics of the motor are considerably sensitive to the inputted voltage.

Accordingly, in order to control the polygon BLDG motor, not only the high resolution speed detection, but also the count values of the high resolution of the velocity command input (motor applied voltage) and the clock counter value are required.

Given the above, in order to control the polygon BLDG motor, the required information including main clock frequency, PWM frequency and velocity command input (motor applied voltage) is checked.

First, in a digital speed controller, the detection resolution of the frequency and phase errors depend on the frequency of the main clock. Although increasing the frequency of the main clock can make the detection resolution efficient for the detection of error detection, it is not so efficient in terms of chip implementation since the bit increases in each register. Accordingly, a proper use of main clock is required.

Specifically, assuming the maximum driving frequency (==PolygonCmdHz) of the polygon BLDG motor as 4 KHz, and the targeted speed error limit (==RippleLimit) as 0.005%, the minimum clock for detection is:

$$Mclk = 4000 * 1/0.005 * 100 = 80 \text{ MHz}$$

However, considering the error ahead and behind the digital edge, it is necessary to use frequency two times larger than the minimum frequency, and thus use the main clock exceeding 160 MHz.

Next, the velocity command input (motor applied voltage) is checked. The digital PWM generation is generally used in the digital controlling. The digital PWM generation sets period and duty using the clock counters of the main clock and is used for the controlling of motor with 20 KHz to 100 KHz bands.

Meanwhile, in order to determine the PWM frequency for use in the polygon BLDG motor, switching frequency of the motor phase voltage has to be taken into consideration. In the case of 120° excitation method, the phase voltage switching frequency is approximately 10 KHz, and thus for controlling purpose, it is efficient to use the PWM frequency ten times larger than the minimum switching frequency.

As explained above, the PWM frequency is very important, but it is equally important to determine the clock counter values which are used for determining the PWM frequency. The clock counter values are determined by the frequency of the main clock and the PWM frequency. Using the general PWM specification used in the driving of a motor, the resolution of the velocity command voltage is:

$$Vdc=24V, MCLK=50 \text{ MHz}, PWM \text{ Frequency}=20 \text{ KHz} ===> PWM \text{ Period}=50 \text{ MHz}/20 \text{ KHz}=2500$$

$$\text{Velocity command voltage resolution}=24*(1/2500) = 0.0096[V]$$

Accordingly, the minimum step of the voltage applied to the motor to satisfy the above-mentioned conditions is 0.0096V.

However, since the polygon BLDC motor responds more sensitively to the voltage than general driving systems, although it would vary depending on the BLDC motors, the velocity command voltage resolution for the controlling of the polygon BLDG has to have minimum 0.002V of input voltage resolution. That is, if 24V voltage is used, the clock counter of the PWM period has to be 12000 or higher, and if 100 KHz PWM frequency is used in such a situation, the frequency of the main clock to generate the PWM frequency has to be 1200 MHz.

Accordingly, the motor control apparatus 200 for controlling the polygon BLDG motor has to be designed to have 160 MHz or higher sampling frequency of the sensor unit 220, 100 KHz of more of PWM frequency generated at the PWM generating unit 250, and 0.0002 V or lower resolution of the PWM 1 duty of the motor command voltage.

Meanwhile, the high resources as those explained above are required to control the polygon BLDG motor by the digital PLL control. Accordingly, as illustrated in FIG. 13, the motor control apparatus 200' may be implemented using both the analog controller 202 and the digital controller 201.

Referring to FIG. 13, the motor control apparatus 200' may include a communication interface unit 210, a sensor unit 220, a digital control unit 201, an analog control unit 202 a switching unit 258, a driving control unit 260, and a driving signal unit 270.

The communication interface unit 210, the sensor unit 220, the driving control unit 260 and the driving signal unit 270 carry out the same operations as those illustrated in FIGS. 2 and 3. Therefore, detailed explanation of the above elements will be omitted for the sake of brevity.

The analog control unit 202 controls in an analog manner, the operation of the driving signal unit base on the received digital control command and the detected driving information. Specifically, the analog control unit 202 may include an analog error detecting unit 235, an analog PLL 245, and an analog PWM generating unit 255.

The analog error detecting unit 235 may generate an analog error value by comparing analogously the velocity command value from among the received digital control command, with the detected driving velocity.

The analog PLL 245 and the analog PWM generating unit 255 may generate a PWM signal for the controlling of the BLDC motor, using the conventional PLL controlling and the analog error value generated at the analog error detecting unit 235. Since the analog PWM generating unit 255 generates PWM signals using triangle-wave, no limit is imposed in terms of the duty resolution.

The switching unit 258 switches the connection status between the driving control unit 260 and the driving signal unit 270, with respect to the digital control unit 201 or the analog control unit 202. Specifically, the switching unit 258 may switch the connection status between the driving control unit 260 and the driving signal unit 270 with respect to the digital control unit 201 or the analog control unit 202 according to the digital control command received from the communication interface unit 210. For example, if the polygon BLDC motor is connected to the motor control apparatus 200', the switching unit 258 electrically connects the analog control unit 202 to the driving control unit 260 so that the BLDC motor is controlled through the analog control unit 202. On the contrary, if the fuser motor or OPC BLDG motor is connected to the motor control apparatus 200', the switching unit 258 may electrically connect the digital control unit 201 to the driving control unit 260 so that the BLDC motor is controlled through the digital control unit 201.

Figure 14:
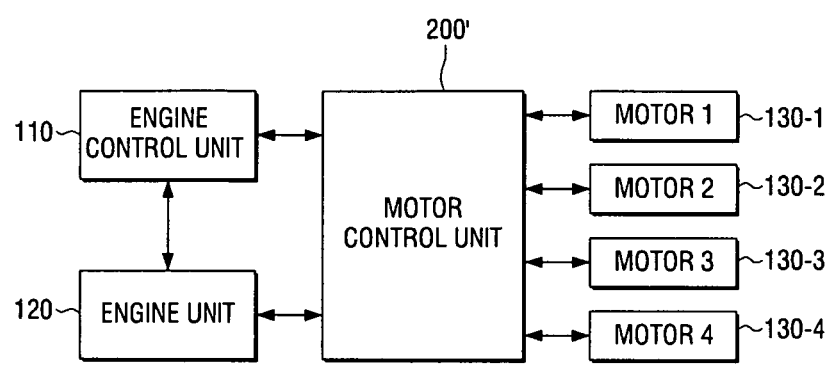
FIG. 14 illustrates an image forming apparatus according to another embodiment.

FIG. 14 illustrates an image forming apparatus according to another embodiment.

Referring to FIG. 14, the image forming apparatus 1000' may include an engine control unit 110, an engine unit 120, a plurality of BLDG motors 130-1, 130-2, 130-3, 130-4 and a motor control apparatus 200'.

The engine control unit 110 and the engine unit 120, and the BLDC motor 130 have the same structure and operation as those illustrated above with reference to FIG. 1. Accordingly, detailed explanation of the overlapping components will be omitted for the sake of brevity.

The motor control apparatus 200' controls a plurality of BLDG motors. Specifically, the motor control apparatus 200' may include a communication interface unit 210 provided within one signal ASIC chip, a plurality of sensor units, a plurality of digital control units, and a plurality of driving signal units.

Since the structures and operations of the sensor unit, digital control unit and driving signal unit of the motor control apparatus 200' have already explained above with reference to FIGS. 2 and 3, the detailed explanation of overlapping components will be omitted for the sake of brevity.

The communication interface unit 210 transfers the received digital control command to a corresponding digital control unit 201 from among the plurality of digital control units 201. Specifically, the communication interface unit 210 determines the corresponding channel of the received digital control command and then transfers the digital control command to the corresponding channel.

Although the motor control unit 200' controls the four same BLDC motors according to an embodiment, some of the digital control units within the motor control unit 200' may control the DC motor.

Figure 15:
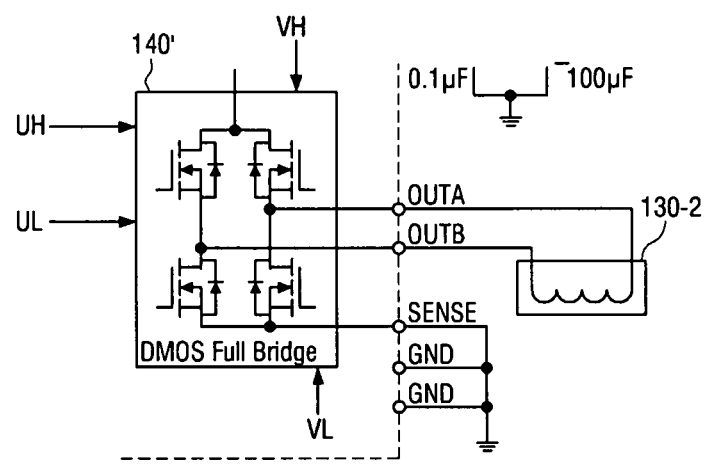
FIG. 15 is a view illustrating a manner of setting up a connection when controlling the DC motor uses the motor control apparatus according to an embodiment.

FIG. 15 illustrates a method of setting up a connection when the motor control apparatus is used to control the DC motor according to an embodiment.

If an encoder is used to acquire information about the motor rotation, the signal from the encoder may be used as the velocity information (i.e., FG signal) of the motor. Additionally, since the output phase has to be fixed in a predetermined position in a single phase DC motor, the Hall input may be fixed in a predetermined status. For example, to operate in CCW direction, the Hall signals with respect to HA, HB, and HC may be set to 1 0 1, while to operate in CW direction, the Hall signals with respect to HA, HB, and HC may be set to 0 1 0.

Specifically, if the input ends of HA, HB, HC are fixed to 1, 0, 1, according to the table of FIG. 12, there are outputs from VH and UL ends, and the transistor FET connected to VH and UL is turned on, so that the electric current flows to the DC motor to rotate the motor. Meanwhile, the DC motor may be controlled using H bridge type of switching element 140'.

Meanwhile, the command voltage for controlling the rotational velocity may be controlled based on the PWM duty change at the UL end by the command value of the PLL controller.

On the contrary, if the input ends of HA, HB and HC are fixed to 0, 1, 0 for the change of rotational direction, according to the table of FIG. 12, there are outputs from UH and VL ends, so that the transistor FET connected to UH and VL is turned on, and the electric current flows to the DC motor to rotate the motor in opposite direction.

Figure 16:
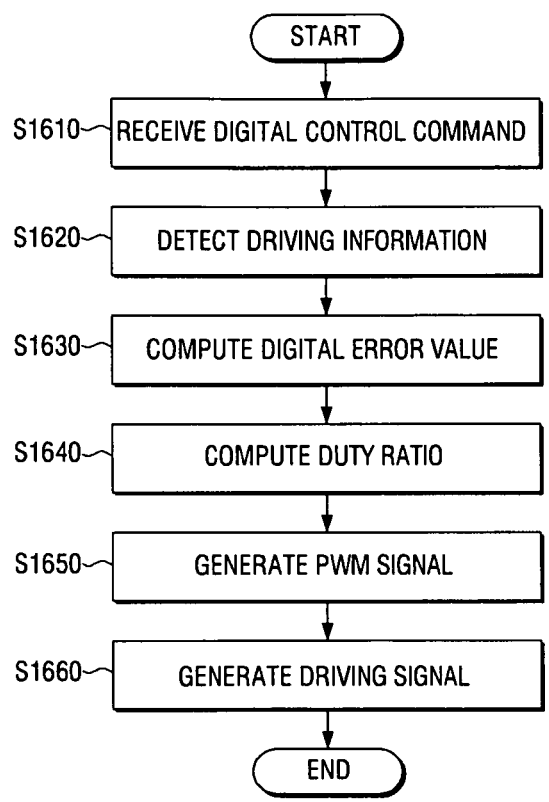
FIG. 16 is a flowchart provided to explain a motor control method according to an embodiment.

FIG. 16 is a flowchart provided to explain a motor control method according to an embodiment.

Referring to FIG. 16, at S1610, if a digital control command with respect to the BLDC motor is received, a control signal is read out from the received digital control command. Specifically, if a digital control command is received through the SPI which enables exchange of data between two devices by serial communication and the bidirectional serial bus I$_2$C, the various control signals with respect to the BLDC motor are read out from the digital control command. The control signal may include information regarding the BLDC motor, including rotation start/stop, acceleration/deceleration, direction of rotation, velocity command value, brake operation, lock time, or digital gain value.

At S1620, the driving information of the BLDC motor is detected. Specifically, the electric angle information and the velocity information of the BLDC motor may be detected.

At S1630, the digital error value is computed by comparing the received digital control command with the detected driving information. Specifically, the frequency error value and/or phase error value may be computed by comparing the velocity command value with respect to the BLDC motor with the velocity information of the BLDC motor. The detailed operation of computing the frequency and phase error values are explained above with reference to FIGS. 4 and 5, and therefore, detailed explanation thereof will be omitted for the sake of brevity.

At S1640, the PWM duty ratio of the BLDC motor is computed using the computed digital error value and the digital gain value. Specifically, using the computed frequency error value, phase error value, and digital gain value, it is possible to compute the PWM duty ratio (or command voltage) with respect to the BLDG motor.

At S1650, a PWM signal with respect to the BLDC motor may be generated based on the computed PWM duty ratio. At S1660, the driving signal of the BLDG motor is generated based on the generated PWM signal. Specifically, the driving signal may be generated based on the generated PWM signal and the detected driving information.

The operations at S1610 to S1660 may be executed in one ASIC chip. Since it is possible to control output of four or more channels within one ASIC chip, it is possible to perform controlling with respect to not only mono LBP, but also tandem C-LBP, using one ASIC chip. The motor control method as the one illustrated in FIG. 16 is implementable in the motor control apparatus having the structures as shown in FIG. 2 or FIG. 3, or in other motor control apparatus with different structures.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. An image forming apparatus, comprising:
   an engine unit used for performing an image forming job;
   an engine control unit which controls the operation of the engine unit;
   a brushless direct current (BLDC) motor which drives the engine unit;
   a sensor unit which senses the driving information of the BLDC motor;
   a communication interface unit which receives a digital control command with respect to the BLDC motor from the engine control unit;
   a driving signal unit which generates a driving signal to control the BLDC motor; and
   a digital control unit which controls the operation of the driving signal unit in a digital phase locked loop (PLL) manner, based on the received digital control command, the detected driving information and a digital gain value as a control factor with respect to the BLDC motor,
   wherein the digital control unit includes an error detecting unit which computes a digital error value by comparing the received digital control command with the detected driving information, and
   the error detecting unit comprises a frequency error detecting unit which computes a frequency error value by comparing a velocity command value with respect to the BLDC motor with velocity information of the BLDC motor, and a phase error detecting unit which computes a phase error value by comparing a velocity command value with respect to the BLDC motor with velocity information of the BLDC motor.

2. A motor control apparatus, comprising:
   a brushless direct current (BLDC) motor;
   a communication interface unit which receives a digital control command with respect to the BLDC motor;
   a sensor unit which detects the driving information of the BLDC motor;
   a driving signal unit which generates a driving signal to control the BLDC motor; and
   a digital control unit which controls the operation of the driving signal unit in a digital phase locked loop (PLL) manner, based on the received digital control command, the detected driving information and a digital gain value as a control factor with respect to the BLDC motor,
   wherein the digital control unit includes an error detecting unit which computes a digital error value by comparing the received digital control command with the detected driving information, and the error detecting unit comprises a frequency error detecting unit which computes a frequency error value by comparing a velocity command value with respect to the BLDC motor with velocity information of the BLDC motor, and a phase error detecting unit which computes a phase error value by comparing a velocity command value with respect to the BLDC motor with velocity information of the BLDC motor.

3. The motor control apparatus of claim 2, wherein the digital control unit further comprises:
   a computing unit which computes a pulse width modulation (PWM) duty ratio of the BLDC motor using the computed digital error value and the digital gain value; and
   a PWM generating unit which generates the PWM signal with respect to the BLDC motor based on the computed PWM duty ratio.

4. The motor control apparatus of claim 3, wherein the computing unit computes the PWM duty ratio by computing shift operation with respect to the computed frequency error value and the computed phase error value, and a digital gain value corresponding to the frequency error value and the phase error value.

5. The motor control apparatus of claim 2, wherein the sensor unit comprises:
   an electric angle detecting unit which receives electric angle information from a Hall sensor attached to the BLDC motor; and
   a velocity detecting unit which receives the velocity information of the BLDC motor as a frequency form.

6. The motor control apparatus of claim 5, wherein the digital control unit controls the operation of the driving signal unit using the velocity information of the velocity detecting unit in a digital manner.

7. The motor control apparatus of claim 5, wherein the sensor unit further comprises a tacho generating unit which generates velocity information regarding the BLDC motor using the received electric angle information,
   the digital control unit controls the operation of the driving signal unit in a digital manner using the velocity information of the tacho generating unit.

8. The motor control apparatus of claim 2, further comprising:
   an analog control unit which analogously controls the operation of the driving signal unit based on the received digital control command and the detected driving information; and
   a switching unit which switches a connectional status between the driving signal unit with the digital control unit or the analog control unit.

9. The motor control apparatus of claim 2, wherein the communication interface receives the digital control command in one of serial peripheral interface (SPI) and $I_2C$.

10. The motor control apparatus of claim 2, wherein the digital control command comprises at least one information from among: rotation start/stop, acceleration/deceleration, direction of rotation, velocity command value, brake operation, lock time, and a digital gain value, with respect to the BLDC motor.

11. The motor control apparatus of claim 2, further comprising a register which stores the received digital control command.

12. The motor control apparatus of claim 2, further comprising a lock protection unit which stops the operation of the driving signal unit based on lock time from among the received digital control commands.

13. The motor control apparatus of claim 2, further comprising a direct current (DC) motor, and wherein the digital control unit controls the DC motor, while also controlling the BLDC motor.

14. The motor control apparatus of claim 2, further comprising a plurality of BLDC motors and a plurality of sensor units, digital control units and driving signal units corresponding to the plurality of BLDC motors, respectively,
   wherein the communication interface unit transfers the received digital control command to a corresponding digital control unit from among the plurality of digital control units.

15. The motor control apparatus of claim 2, wherein the BLDC motor is at least one of an organic photo conductor (OPC) motor, fuser motor and polygon motor.

16. The motor control apparatus of claim 2, wherein the communication interface unit and the digital control unit are implemented as one single chip.

17. A motor control method of a brushless direct control (BLDC) motor, the method comprising:
   receiving a digital control command with respect to the BLDC motor;
   detecting the driving information of the BLDC motor, the driving information of the BLDC motor including rotation velocity information of the BLDC motor;
   computing a digital error value by comparing the received digital control command with the detected driving information, the computing the digital error value including computing a frequency error value by comparing a velocity command value with respect to the BLDG motor with velocity information of the BLDC motor, and computing a phase error value by comparing a velocity command value with respect to the BLDC motor with velocity information of the BLDC motor;
   computing a pulse width modulation (PWM) duty ratio of the BLDC motor using the computed digital error value and the digital gain value; and
   generating the PWM signal with respect to the BLDC motor based on the computed PWM duty ratio; and
   generating a driving signal to control the BLDC motor based on the generated PWM signal.

18. The method of claim 17, wherein the driving information further comprises electric angle information of the BLDC motor.

19. The method of claim 17, wherein the generating the driving signal comprises generating a driving signal with respect to at least one of a stepper motor and a DC motor, while also generating the driving signal regarding the BLDC motor.

\* \* \* \* \*

UNITED STATES PATENT AND TRADEMARK OFFICE
CERTIFICATE OF CORRECTION

| | |
|---|---|
| PATENT NO. | : 8,598,830 B2 |
| APPLICATION NO. | : 13/064326 |
| DATED | : December 3, 2013 |
| INVENTOR(S) | : Hyoung-il Kim et al. |

It is certified that error appears in the above-identified patent and that said Letters Patent is hereby corrected as shown below:

On the Title page, Item 75, In Column 1 (Inventors), Line 5, Delete "Gwon-hoon" and insert -- Geon-hoon --, therefor.

Signed and Sealed this
First Day of April, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,598,830 B2 |
| APPLICATION NO. | : 13/064326 |
| DATED | : December 3, 2013 |
| INVENTOR(S) | : Hyoung-il Kim et al. |

Page 1 of 1

It is certified that error appears in the above-identified patent and that said Letters Patent is hereby corrected as shown below:

On the title page, in item (75) Inventors, delete "Gwon-hoon Kim" and insert --Geon-hoon Kim-- therefore.

On the title page, in item (75) Inventors, delete "Yae-young Kim" and insert --Tae-young Kim-- therefore.

This certificate supersedes the Certificate of Correction issued April 1, 2014.

Signed and Sealed this
Third Day of June, 2014

Michelle K. Lee
*Deputy Director of the United States Patent and Trademark Office*